US010419340B2

United States Patent
Wu et al.

(10) Patent No.: US 10,419,340 B2
(45) Date of Patent: *Sep. 17, 2019

(54) STATEFUL CONNECTION OPTIMIZATION OVER STRETCHED NETWORKS USING SPECIFIC PREFIX ROUTES

(71) Applicant: VMware, Inc., Palo Alto, CA (US)

(72) Inventors: Weiqing Wu, Cupertino, CA (US); Aravind Srinivasan, Santa Clara, CA (US); Serge Maskalik, Los Gatos, CA (US); Todd Sabin, Morganville, NJ (US); Sachin Thakkar, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/690,224

(22) Filed: Aug. 29, 2017

(65) Prior Publication Data
US 2018/0062993 A1 Mar. 1, 2018

Related U.S. Application Data

(60) Provisional application No. 62/380,991, filed on Aug. 29, 2016.

(51) Int. Cl.
*H04L 29/06* (2006.01)
*H04L 12/741* (2013.01)
(Continued)

(52) U.S. Cl.
CPC .......... *H04L 45/74* (2013.01); *G06F 9/45558* (2013.01); *G06F 9/5077* (2013.01);
(Continued)

(58) Field of Classification Search
CPC ... H04L 45/74; H04L 61/6022; H04L 61/103; H04L 41/083; H04L 67/2814;
(Continued)

(56) References Cited

U.S. PATENT DOCUMENTS

| 2013/0044764 | A1* | 2/2013 | Casado | H04L 12/66 370/401 |
| 2013/0058225 | A1* | 3/2013 | Casado | H04L 12/4633 370/250 |

(Continued)

*Primary Examiner* — Phuc H Tran
(74) *Attorney, Agent, or Firm* — Patterson + Sheridan, LLP

(57) ABSTRACT

Techniques for stateful connection optimization over stretched networks are disclosed. Such stretched networks may extend across both a data center and a cloud. In one embodiment, configuration changes are made to cloud layer 2 (L2) concentrators used by extended networks and a cloud router such that the L2 concentrators block packets with the cloud router's source MAC address and block address resolution protocol (ARP) requests for a gateway IP address from/to cloud networks that are part of the extended networks. Further, the cloud router is configured with the same gateway IP address as that of a default gateway router in the data center and responds to ARP requests for the gateway IP address with its own MAC address. In addition, specific prefix routes (e.g., /32 routes) for virtual computing instances on route optimized networks in the cloud are injected into the cloud router and propagating to a data center router.

20 Claims, 10 Drawing Sheets

(51) Int. Cl.
*H04L 29/12* (2006.01)
*H04L 12/46* (2006.01)
*G06F 9/455* (2018.01)
*H04L 12/24* (2006.01)
*H04L 12/803* (2013.01)
*H04L 12/805* (2013.01)
*G06F 9/50* (2006.01)
*H04L 12/721* (2013.01)
*H04L 12/715* (2013.01)
*H04L 12/931* (2013.01)
*H04L 29/08* (2006.01)

(52) U.S. Cl.
CPC .......... *H04L 12/462* (2013.01); *H04L 41/083* (2013.01); *H04L 41/0816* (2013.01); *H04L 45/38* (2013.01); *H04L 45/64* (2013.01); *H04L 45/745* (2013.01); *H04L 47/122* (2013.01); *H04L 47/365* (2013.01); *H04L 49/70* (2013.01); *H04L 61/103* (2013.01); *H04L 61/2007* (2013.01); *H04L 61/6022* (2013.01); *H04L 67/2814* (2013.01); *G06F 2009/4557* (2013.01); *G06F 2009/45595* (2013.01); *H04L 41/5096* (2013.01); *H04L 45/66* (2013.01); *H04L 67/101* (2013.01); *H04L 67/1031* (2013.01)

(58) Field of Classification Search
CPC ......... H04L 49/70; H04L 45/64; H04L 45/38; H04L 45/745; H04L 47/122; H04L 47/365; H04L 41/0816; H04L 12/462; H04L 61/2007; H04L 67/101; H04L 41/5096; H04L 45/66; H04L 67/1031; G06F 9/45558; G06F 9/5077; G06F 2009/45595; G06F 2009/4557
See application file for complete search history.

(56) References Cited

U.S. PATENT DOCUMENTS

2015/0020188 A1* 1/2015 Segal .................. H04L 63/0227 726/13
2016/0308785 A1* 10/2016 Padmanabhan ..... G06F 9/45558
2017/0317919 A1* 11/2017 Fernando ................ H04L 45/16

* cited by examiner

STATEFUL CONNECTION OPTIMIZATION OVER STRETCHED NETWORKS USING SPECIFIC PREFIX ROUTES

CROSS-REFERENCE TO RELATED APPLICATIONS

This application claims the benefit of U.S. Provisional Patent Application No. 62/380,991, filed Aug. 29, 2016, the entire contents of which are incorporated by reference herein.

This application is related to the patent applications entitled "Stateful Connection Optimization Over Stretched Networks Using Packet Introspection" (Ser. No. 15/690,231), "Stateful Connection Optimization Over Stretched Networks with Temporary Tromboning (Ser. No. 15/690,235), "Creating Layer 2 Extension Networks in a Hybrid Cloud Computing System" (Ser. No. 15/690,225), and "Low Downtime Software-Defined Wide Area Network Service Upgrade" (Ser. No. 15/690,230), which are assigned to the assignee of this application and filed on the same day as this application and which are herein incorporated by reference in their entireties.

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs such as virtual machines (VMs) and logical networks. However, the use of such public cloud services is typically kept separate from the use of existing computing resources in data centers managed by an enterprise.

With an increasing trend in migrating data centers to cloud platforms, a hybrid model has been developed that combines public cloud services and traditional on-premise data center computing resources. Such hybrid cloud computing systems permit workloads, such as virtual machines, to be rapidly moved from the data center to the cloud. Network extension, in which networks are created that stretch across both the data center and the cloud, enables seamless workload migration by allowing endpoint network configuration and connections to existing networks in the data center to be kept when workloads are moved to the cloud. However, traditional network extension can result in undesirable traffic patterns such as tromboning, in which traffic between sources and destinations that coexist within the cloud is routed from the cloud to the physically-separate data center and then back again to the cloud.

SUMMARY

One embodiment disclosed herein provides a computer-implemented method for optimizing connections over an extended network created by bridging a first network in a first computing system, a second network in a second computing system, and a wide area network using a first bridging appliance in the first computing system and a second bridging appliance in the second computing system. The method generally includes configuring the first bridging appliance to: block packets with a source media access control (MAC) address belonging to a first router in the first computing system, and block address resolution protocol (ARP) requests for a gateway Internet Protocol (IP) address from and to the first network. The method further includes configuring the first router to have a same gateway IP address as a second router in the second computing system that is a default gateway of the extended network. In addition, the method includes injecting, into the first router, one or more specific prefix routes for one or more respective virtual computing instances on the first network, and propogating the one or more specific prefix routes to the second router.

Further embodiments of the present invention include computer systems configured to carry out the above methods, and non-transitory computer-readable storage media comprising instructions that cause the computer system to carry out the above methods.

DETAILED DESCRIPTION

Embodiments presented herein provide techniques for stateful connection optimization over stretched networks (also referred to herein as "extended networks") that eliminate undesirable traffic patterns such as tromboning. As described, extended networks may stretch across both a data center and a cloud. In one embodiment, configuration changes are made to cloud layer 2 (L2) concentrators used by extended networks and a cloud router such that the L2 concentrators block packets with the cloud router's source MAC address and block address resolution protocol (ARP) requests for a gateway Internet Protocol (IP) address from/to cloud networks that are part of the extended networks. Further, the cloud router is configured with the same gateway IP address as that of a default gateway router in the data center and will respond to the ARP requests for the gateway IP address with its own MAC address. As a result, traffic internal to the data center and cloud that would otherwise trombone from the cloud back to the default gateway router in the data center may instead be routed efficiently via the cloud router. In addition, to eliminate inefficient routing of external traffic, specific prefix routes, such as /32 routes, for virtual computing instances (e.g., virtual machines (VMs)) that are on route optimized networks in the cloud are injected into the cloud router and propagating to a router in the data center. As a result, the cloud router's routing table will include connected routes to those virtual computing instances' addresses, while the data center router will announce out that those addresses are reachable via the cloud router.

Although described herein primarily with respect to virtual computing instances that are VMs, it should be understood that techniques disclosed herein are also applicable for providing stateful connection optimization over stretched networks to other types of virtualized computing instances, such as containers that implement operating system—level virtualization, wherein an abstraction layer is provided on top of the kernel of an operating system on a host computer (see, e.g., www.docker.com).

System Overview

Figure 1:
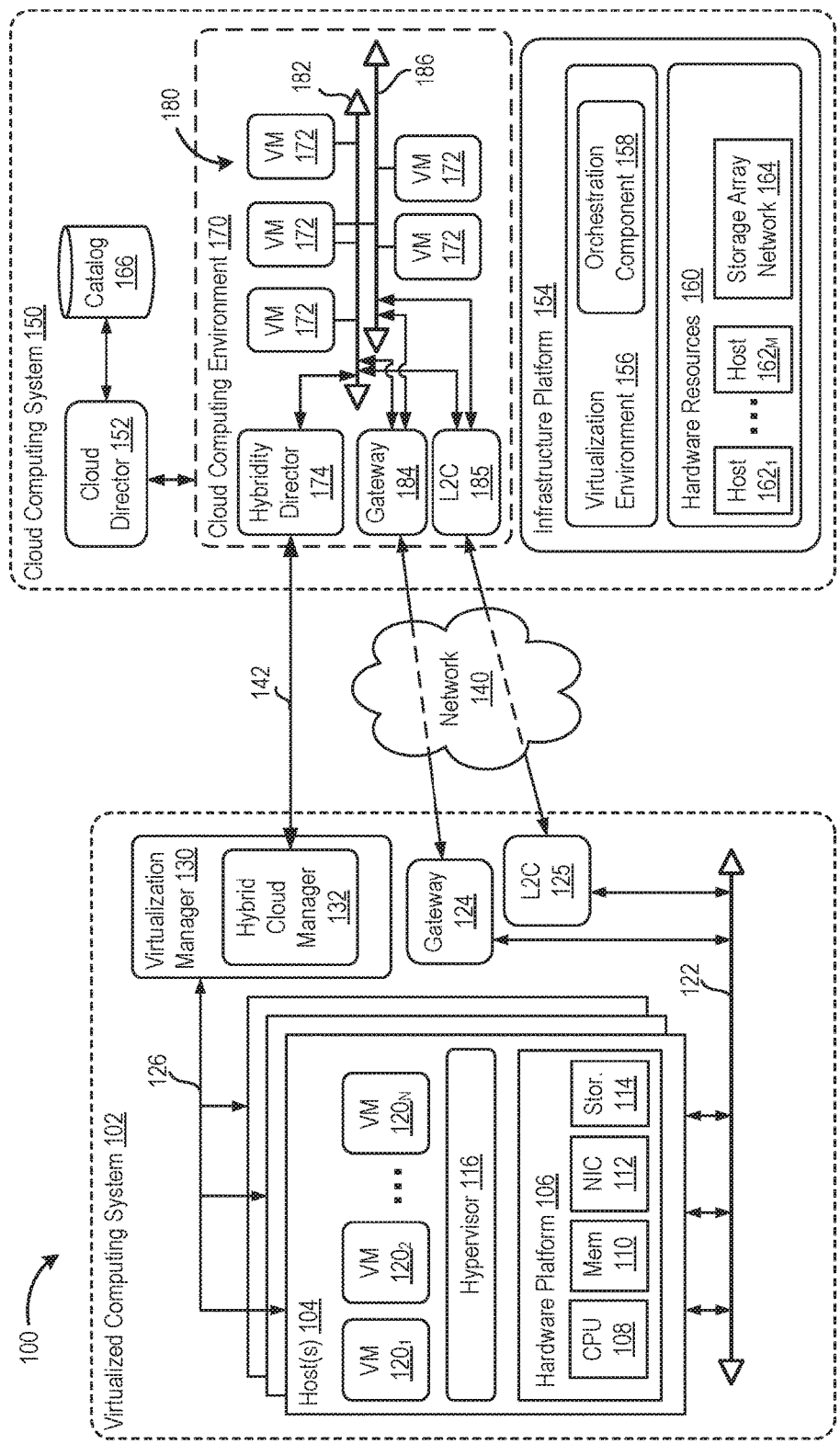
FIG. 1 is a block diagram of a hybrid cloud computing system in which one or more embodiments of the present disclosure may be utilized.

FIG. 1 is a block diagram of a hybrid cloud computing system 100 in which one or more embodiments of the present disclosure may be utilized. As shown, hybrid cloud computing system 100 includes a virtualized computing system 102 and a cloud computing system 150, and is configured to provide a common platform for managing and executing virtual workloads seamlessly between virtualized computing system 102 and cloud computing system 150. In one embodiment, virtualized computing system 102 may be a data center controlled and administrated by a particular enterprise or business organization, while cloud computing system 150 is operated by a cloud computing service provider and exposed as a service available to account holders, such as the particular enterprise in addition to other enterprises. As such, virtualized computing system 102 may sometimes be referred to as an on-premise data center(s), and cloud computing system 150 may be referred to as a "public" cloud service. In some embodiments, virtualized computing system 102 itself may be configured as a private cloud service providing cloud services to various organizations within the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Virtualized computing system 102 includes one or more host computer systems 104. Hosts 104 may each be constructed on a server grade hardware platform 106, such as an x86 architecture platform, a desktop, or a laptop. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within virtualized computing system 102. Network interface 112 may be one or more network adapters, also referred to as a Network Interface Card (NIC). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere® solution made commercially available from VMware, Inc. Hypervisor 116 may run on top of the operating system of host 104 or directly on hardware components of host 104. In addition, hypervisor 116 may provide a virtual switch (not shown), which is a software-based switch acting as a layer 2 (L2) forwarding engine and may be capable of performing VLAN tagging, stripping, filtering, L2 security, checksum, segmentation offload units, and other tasks typically performed by physical switches. The virtual switch may include uplink ports which connect to physical network adapters, as well as VM ports which connect to virtual network adapters and provide connections for hypervisor 116 and VMs. In one embodiment, the virtual switch may be part of a distributed virtual switch that is an abstraction of a switch across multiple host servers and that permits virtual switches on the multiple host servers to be managed as if ports of those virtual switches belonged to a single switch, the distributed virtual switch.

Virtualized computing system 102 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in virtualized computing system 102, or alternatively, running as a VM in one of hosts 104. One example of a virtualization management module is the vCenter Server® product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtualized computing resources provided by cloud computing system 150 with virtualized computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative tasks, as described in greater detail later. In one implementation, hybrid cloud manager 132 is a module or plug-in complement to virtualization manager 130, although other implementations may be used, such as a separate computer program executing in a central server or running in a VM in one of hosts 104.

In one or more embodiments, cloud computing system 150 is configured to dynamically provide an enterprise (or users of an enterprise) with one or more virtual data centers 170 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as a multi-tenant cloud service with logically isolated virtualized computing resources on a shared physical infrastructure. It is recognized that cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and virtual machine packages that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A virtual machine package is a logical container of one or more pre-configured virtual machines that package applications and parameters that define operational details of the package. An example of a VM package is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual machine) is configured to provide VMs 172 and other components in cloud computing environment 170 with connectivity to an external network 140 (e.g., Internet). Gateway 184 manages external public IP addresses for virtual data center 180 and one or more private internal networks interconnecting VMs 172. Gateway 184 is a WAN facing device providing services such as intelligent routing, traffic steering, WAN optimization, encryption, etc. Gateway 184 may be configured to provide virtual private network (VPN) connectivity over a network 140 with another VPN endpoint, such as a gateway 124 within virtualized computing system 102. In other embodiments, gateway 184 may be configured to communicate with virtualized computing system 102 using a high-throughput, dedicated link between virtualized computing system 102 and cloud computing system 150. Layer 2 concentrators (L2C) 125 and 185 are parallel to gateways 124 and 184 and configured to provide a "stretched" L2 network that spans virtualized computing system 102 and cloud computing system 150. Stretched network 145 may be separate from network 140 used by gateways 124 and 184 so that, e.g., VM migration traffic over network 140 does not create latency in stretched network 145. Examples of how to create stretched networks are described in detail in the patent application entitled "Creating Layer 2 Extension Networks in a Hybrid Cloud Computing System" (Ser. No. 15/690,225).

In one embodiment, each virtual data center 180 includes a "hybridity" director module (depicted as hybridity director 174) configured to communicate with the corresponding hybrid cloud manager 132 in virtualized computing system 102 to enable a common virtualized computing platform between virtualized computing system 102 and cloud computing system 150. Hybridity directory (e.g., executing as a virtual machine) may communicate with hybrid cloud manager 132 using Internet-based traffic via a VPN tunnel established between gateways 124 and 184, or alternatively, using direct connect 142.

Inefficient Traffic Routing in Stretched Networks

Figure 2A:
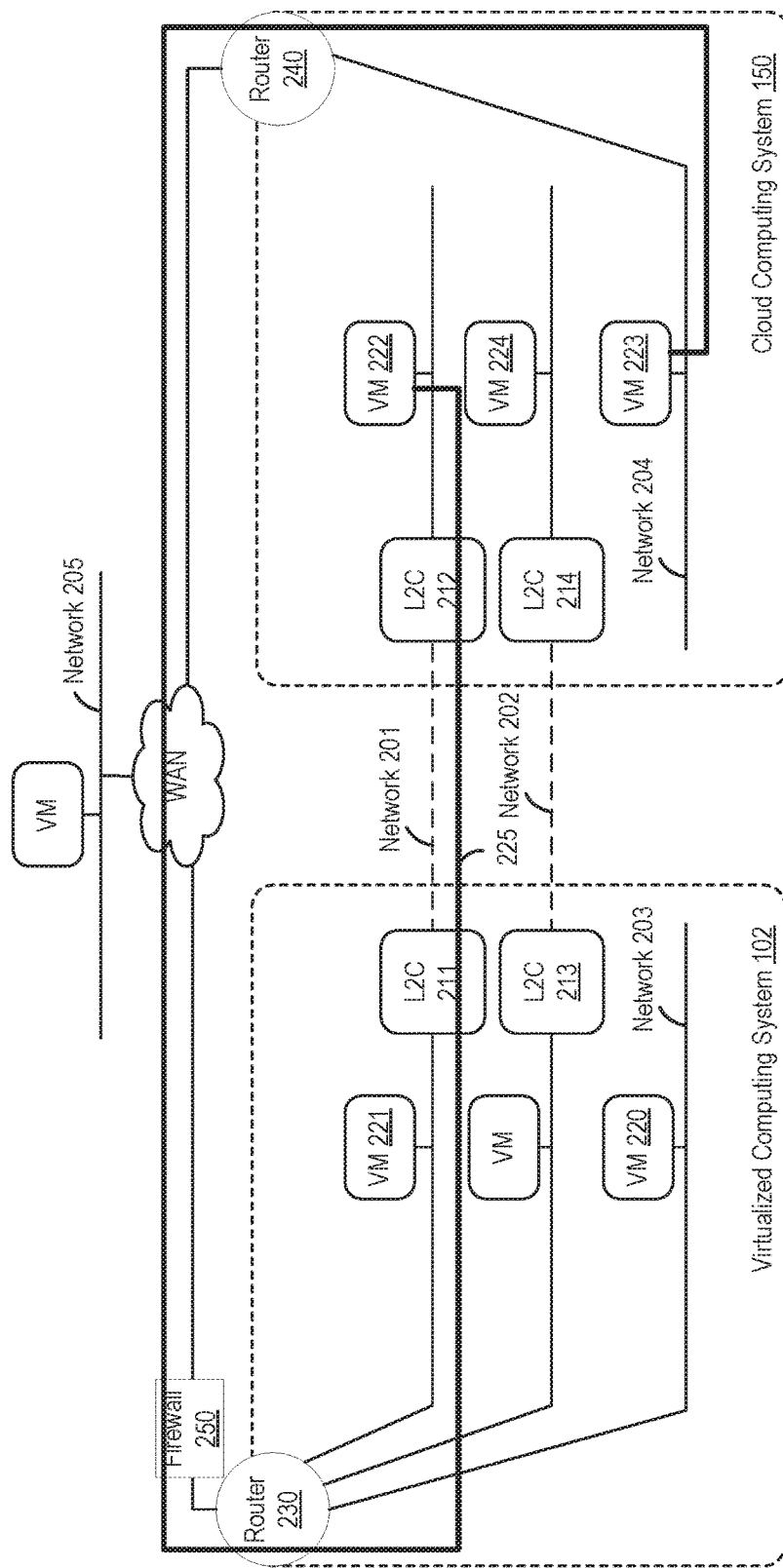
FIG. 2A illustrates an example of inefficient traffic routing.

FIG. 2A illustrates an example of inefficient traffic routing in stretched networks. As shown, networks 201 and 202 are stretched networks that span virtualized computing system 102 and cloud computing system 150, while networks 203 and 204 are networks within virtualized computing system 102 and cloud computing system 150, respectively, and network 205 is an external network outside virtualized computing system 102 and cloud computing system 150. Extended networks 201 and 202 may be created in any feasible fashion, such as creating a new network in cloud computing system 150 corresponding to an existing virtualized computing system 102 network (with the new network having the same gateway address as router 230 in virtualized computing and disconnected from local cloud router 240), plugging a port of a L2 concentrator into the new network on the cloud computing system 150 side and a port of another L2 concentrator into the existing network on the virtualized computing system 102 side, bridging the L2 concentrator pair. A more detailed description of how to create stretched networks is provided in the patent application entitled "Creating Layer 2 Extension Networks in a Hybrid Cloud Computing System" (Ser. No. 15/690,225). Illustratively, each of the L2 concentrators may be configured to bridge (e.g., bridges created by L2 concentrators 211-214) each connected local area network (LAN) link(s) to a wide area network (WAN) link. The cloud-side L2 concentrator bridge may also be configured to drop packets with source MAC address of router 240. It should be understood that multiple LANs may be stretched or a single LAN stretched per L2 concentrator based on, e.g., a clustering scheme.

Without any routing optimization, extended networks such as networks 201 and 202 need to be routed back to virtualized computing system 102 for layer 3 (L3) access, as the default gateway that forwards packets from VMs on extended networks 201 and 202 to other networks is router 230, which is in virtualized computing system 102. For example, router 230 is the default gateway of VM 222 on network 201 and, as a result, traffic 225 between VM 222 and VM 223 on network 204 needs to be routed back to virtualized computing system 102 and through router 230 before the traffic 225 is directed back to cloud computing system 150 through router 240 and then to VM 223. This type of tromboning is an inefficient traffic pattern, as traffic 225 travels back and forth between virtualized computing system 102 and cloud computing system 150 even though both VMs 222 and 223 are on the cloud side. That is, it would be more efficient to route traffic from VM 222 to VM 223 entirely within cloud computing system 150, without having to go through the physically separate virtualized computing system 102.

Figure 2B:
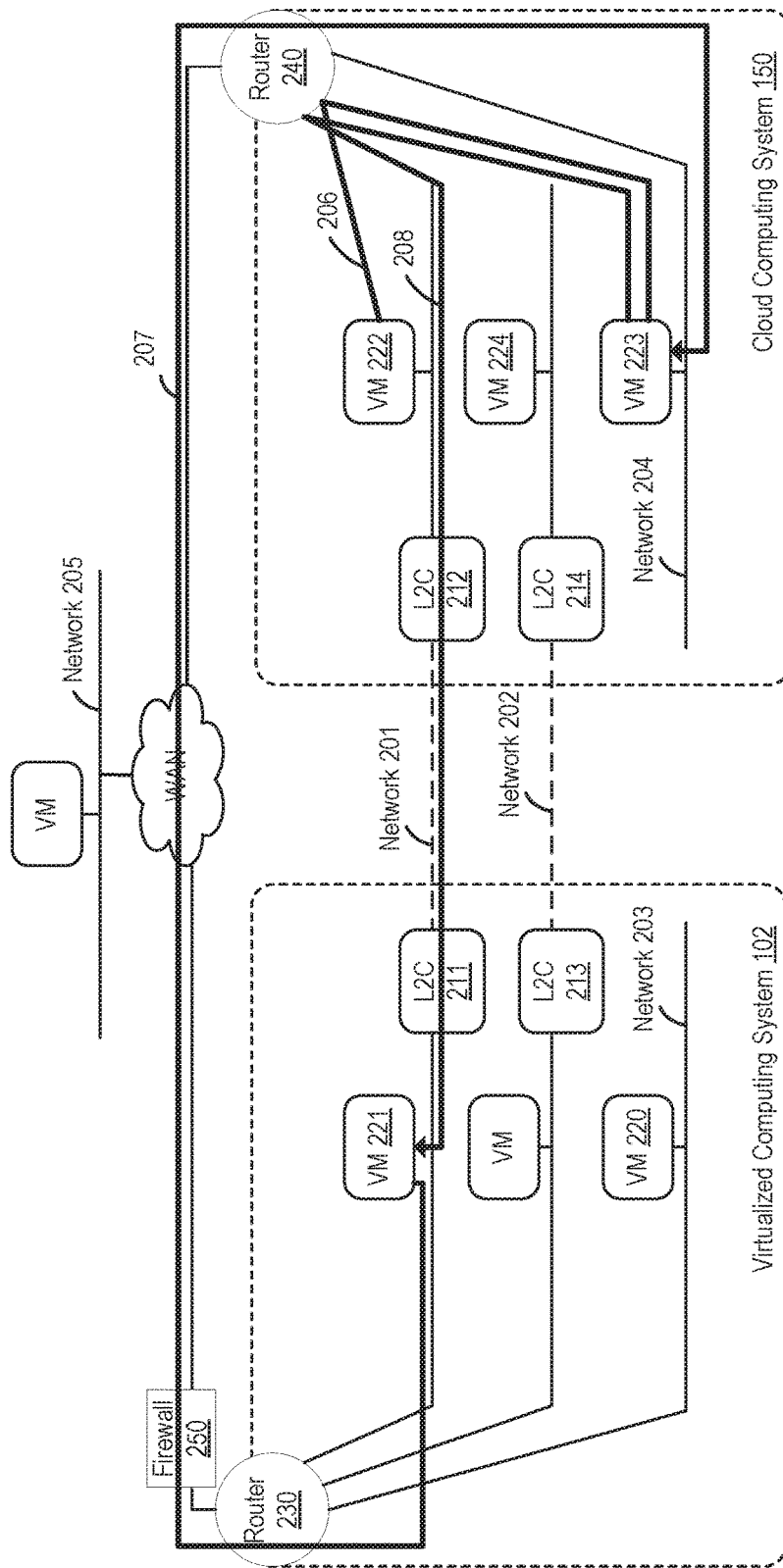
FIG. 2B illustrates an example of asymmetric routing.

FIG. 2B shows a naive egress optimization approach that attempts to solve the tromboning problem discussed above but results in asymmetric routing. As shown, router 240 is set as the default gateway for VMs in cloud computing system 150 that are on extended networks. For example, VM system 222 may be configured to use router 240 as its default gateway such that traffic 206 between VM 222 and VM 223 is routed locally via router 240 without leaving cloud computing system 150. However, the use of different gateways on the same extended network can produce asymmetric routing, in which traffic in one direction from a source to a destination does not follow the same path as traffic back in the opposite direction. Illustratively, router 230 is the default gateway of VM 221, so traffic from VM 221 to VM 223 follows path 207. However, return traffic from VM 223 to VM 221 follows a different path 208. Such asymmetric routing breaks stateful flow inspection middleboxes, such as firewalls (e.g., firewall 250), which will only see one side of a flow (e.g., the TCP SYN) but not the other side (e.g., the TCP SYN_ACK) that returns via a different flow along the other path. Most stateful firewalls require seeing both sides of a flow to distinguish between good and malicious traffic and will not allow asymmetric flows, such as flows along paths 207 and 208, to pass. As routers 230 and 240 are on the edge facing the WAN (e.g., the Internet), firewalls need to be employed to prevent unauthorized network access. As a result, the naive optimization approach of setting router 240 as the default gateway for VMs in cloud computing system 150 that are on extended networks will not work with network topologies such as the topology shown in FIG. 2B.

As FIGS. 2A and 2B show, without routing optimization, routing of traffic between VMs that are migrated to cloud computing system 102 and attached to extended networks (e.g., networks 201 and 202) and VMs on other networks in the cloud may be inefficient, as such traffic is first routed back to a default gateway in virtualized computing system 102. However, applying naive routing optimization may result in, e.g., asymmetric routing of traffic between cloud-side VMs on an extended network and VMs on stub networks on the virtualized computing system 102 side.

Routing Optimization Using Specific Prefix Routes

Figure 3:
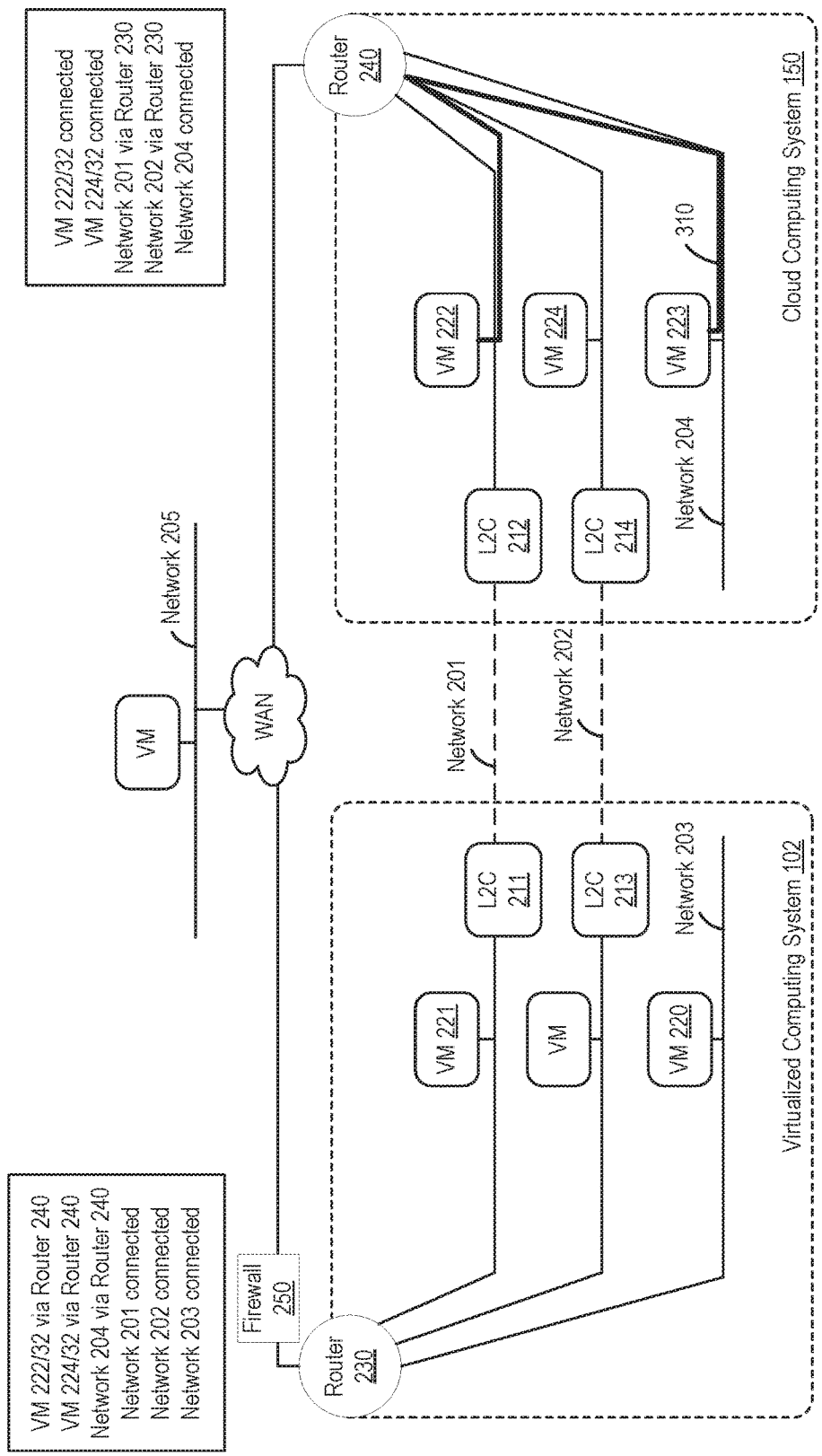
FIG. 3 illustrates an approach for routing optimization in a hybrid cloud computing system using specific prefix routes, according to an embodiment.

FIG. 3 illustrates an approach for routing optimization in a hybrid cloud computing system using specific prefix routes, according to an embodiment. This approach is one way of resolving the tromboning and asymmetric routing problems discussed above. It is assumed for simplicity that extended networks without routing optimization have already been created, but a similar approach may be employed for routing optimization during the creation of an extended network, as described in greater detail below.

In one embodiment, hybridity director 174 router 240 optimizes routing to eliminate inefficient tromboning by making configuration changes to L2 concentrators 212 and 214 and router 240; injecting specific prefix routes, such as /32 routes, into router 240; and propagating those specific prefix routes back to router 230. In particular, hybridity director 174 configures L2 concentrators 212 or 214 used by extended networks 201 and 202 to block packets with the cloud computing system router's (e.g., router 240) source MAC address and to block ARP requests for a gateway IP address from/to the cloud networks that are parts of the extended networks 201 and 202. By blocking the ARP requests for the gateway IP address from/to the cloud networks in particular, such ARP requests from VMs 222-

223 will not reach the default gateway router 230 and will not receive router 230's MAC address in response. Hybridity director 174 further configures router 240 to have the same gateway IP address as that of the default gateway router 230. As a result, router 240 will respond to VMs 222-223's ARP requests for a gateway IP address with its own MAC address, and cloud VMs 222-223 on extended networks 201 and 202 may then believe they are communicating with their default gateway router 230 when they are actually communicating with router 240. Further, router 240 may maintain a list of local VMs obtained by, e.g., having router 240 update its VM list whenever it receives ARP requests on extended networks. It should be understood that these configurations may eliminates inefficient traffic flows internal to virtualized computing system 102 and cloud computing system 150 such as the tromboning path 225 shown in FIG. 2. For example, packets sent from VM 222 to VM 223 will not take the tromboning path 225 via router 230 in virtualized computing system 102 but will instead be forwarded, based on the MAC address of router 240 obtained through the ARP requests described above, to router 240 and take the efficient path 310.

In addition to making configuration changes to L2 concentrators 212 and 214 and to router 240 to eliminate internal traffic flows that are inefficient, hybridity director 174 also eliminates external (to virtualized computing system 102 and cloud computing system 150) traffic flows that are inefficient by injecting specific prefix routes, such as /32 routes, for VMs on route-optimized networks into router 240 and propagating those routes, as well as routes for networks that are wholly in cloud computing system (e.g., network 204), back to router 230. As shown, hybridity director 174 renumbers router 240 with a /32 IP address, and injects /32 routes into router 240 to indicate ownership of the VM 222/32 and VM 224/32 addresses of VMs 222 and 224, respectively, by router 240. Router 240's routing table 350 may then include connected routes for the VM 222/32 and VM 224/32 addresses, as well as for network 204 that is wholly in cloud computing system 150. Router 240 further propagates the VM 222/32 and VM 224/32 routes and the network 204 route to router 230 in virtualized computing system 102. As a result, router 230's routing table 340 may be updated to indicate that VM 222/32 and VM 224/32 are reachable via router 240 rather than connect routes, as well as that network 204 is reachable via router 240. Then, when router 230 communicates paths to peer routers via BGP, router 230 will announce out that the VM 222/32 and VM 224/32 addresses and network 204 are reachable via router 240, and remote clients such as VM 330 will then communicate with VMs 222-224 in cloud computing system 150 via router 240 rather than via a tromboning path through router 230. For example, router 230 may initially announce a block of /24 addresses, such as 192.168.1.0/24 which includes 256 IP addresses, that are owned by network 201 (and similarly for network 202), and then a VM on network 201 (or on network 202) may move from virtualized computing system 102 to cloud computing system 150. In order to make that VM owned by router 240 in cloud computing system 150, a more specific route (the /32 route) may be injected that takes precedence over the previous /24 route. That is, the /24 route published by router 230 is less specific than the injected /32 route, so there is a more specific route to router 240 over L3 compared to the initial connected route via router 230. In particular, router 240 will fully own the path for other networks to access egress optimization enabled VMs (e.g., VMs 222 and 224), so there will not be multiple paths to create asymmetric routing.

Figure 4:
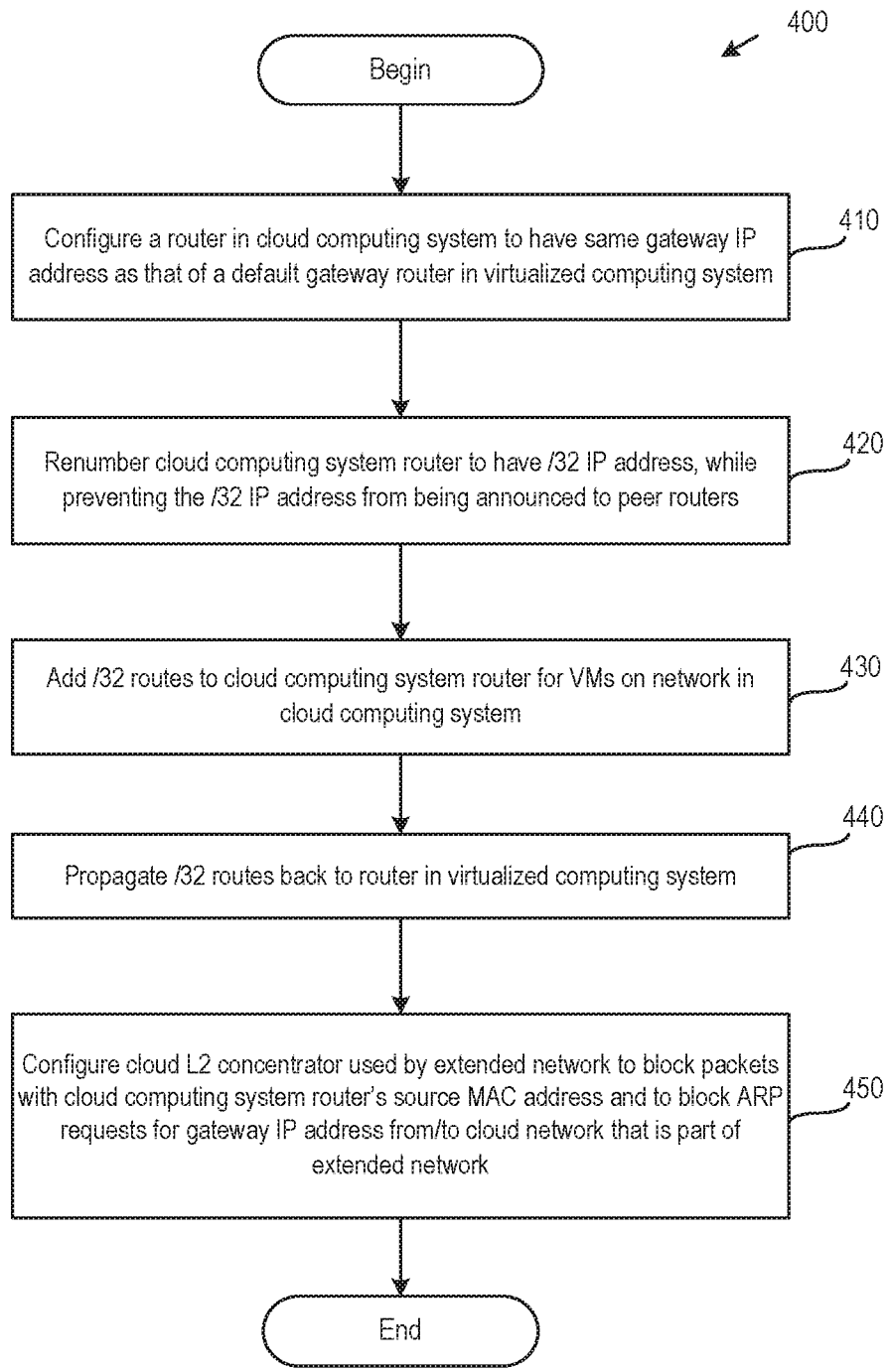
FIG. 4 illustrates a method of optimizing traffic flows in a hybrid cloud computing system using specific prefix routes, according to an embodiment.

FIG. 4 illustrates a method 400 of optimizing traffic flows in a hybrid cloud computing system using specific prefix routes, according to an embodiment. Similar to the discussion above, method 400 assumes that an extended network without routing optimization has already been created, but steps similar to those of method 400 may also be employed for routing optimization during the creation of the extended network.

As shown, method 400 begins at step 410, where hybridity director 174 configures a router (e.g., router 240) in cloud computing system 150 to have the same gateway IP address as that of a default gateway router (e.g., router 230) of the extended network (e.g., networks 201 or 202), where the default gateway router is in virtualized computing system 102. As described, VMs in cloud computing system 150 that are on the extended networks may then believe they are communicating with the default gateway in virtualized computing system 102 when actually communicating with the router in cloud computing system 150.

At step 420, hybridity director 174 renumbers the cloud computing system router (e.g., router 240) to have a /32 IP address, while preventing the /32 IP address from being announced to peer routers.

At step 430, hybridity director 174 adds /32 routes to the cloud computing system router (e.g., router 240) for VMs on the network in cloud computing system 102. Then, at step 440, hybridity director 174 propagates the /32 routes back to a router (e.g., router 230) in virtualized computing system 102. As described, /32 routes are propagated back to router 230 to indicate ownership of the VM 222/32 and VM 224/32 addresses by router 240, as there is a more specific /32 route to router 240 over L3 compared to, e.g., a previous /24 route to router 230. As a result of steps 430 and 440, the cloud router (e.g., router 240) will fully own the path for other networks to access VMs on the network (e.g., network 201 or 202) in cloud computing system 102. For example, as a result of /32 routes being propagated back to router 230, when router 230 communicates paths to peer routers via BGP, router 230 will announce out that the /32 IP addresses of VMs in cloud computing system 150 are reachable via router 240. Accordingly, remote clients such as VM 330 will communicate with VMs in cloud computing system 150 via router 240 rather than via a tromboning path through router 230.

It should be understood that if other VMs (e.g., VM 221) on the extended network migrate from virtualized computing system 102 to cloud computing system, hybridity director 174 may also inject /32 routes for the migrated VMs into the cloud router and those routes may also be propagated back to the virtualized computing system router. For example, an inventory service in hybridity director 174 may be responsible for detecting new VMs being attached or existing VM being re-attached to route-optimized networks in cloud computing system 150 through ports on virtual switch(es). Hybridity director 174 may also be responsible for migrating VMs from virtualized computing system 102 to cloud computing system 150, as described in detail in the patent application entitled "Live Migration of Virtual Computing Instance Between Data Centers" (Ser. No. 15/690, 241), and hybridity director would then be aware that such migrated VMs are local to cloud computing system 150. In addition, information on other VMs, networks, etc. that are on route-optimized networks to cloud computing system 150 may be obtained from, e.g., an inventory maintained by a virtualization management application. Conversely, hybridity director 174 may also detect VMs in cloud computing system 150 being detached from route optimized networks and remove inject /32 routes that are associated with those VMs.

At step 450, hybridity director 174 configures a cloud L2 concentrator (e.g., L2 concentrator 212 or 214) used by the existing extended network to block packets with the cloud computing system router's (e.g., router 240) source MAC address and to block ARP requests for the gateway IP address from/to the cloud network that is part of the existing extended network.

Routing Optimization Using Packet Introspection

Figure 5:
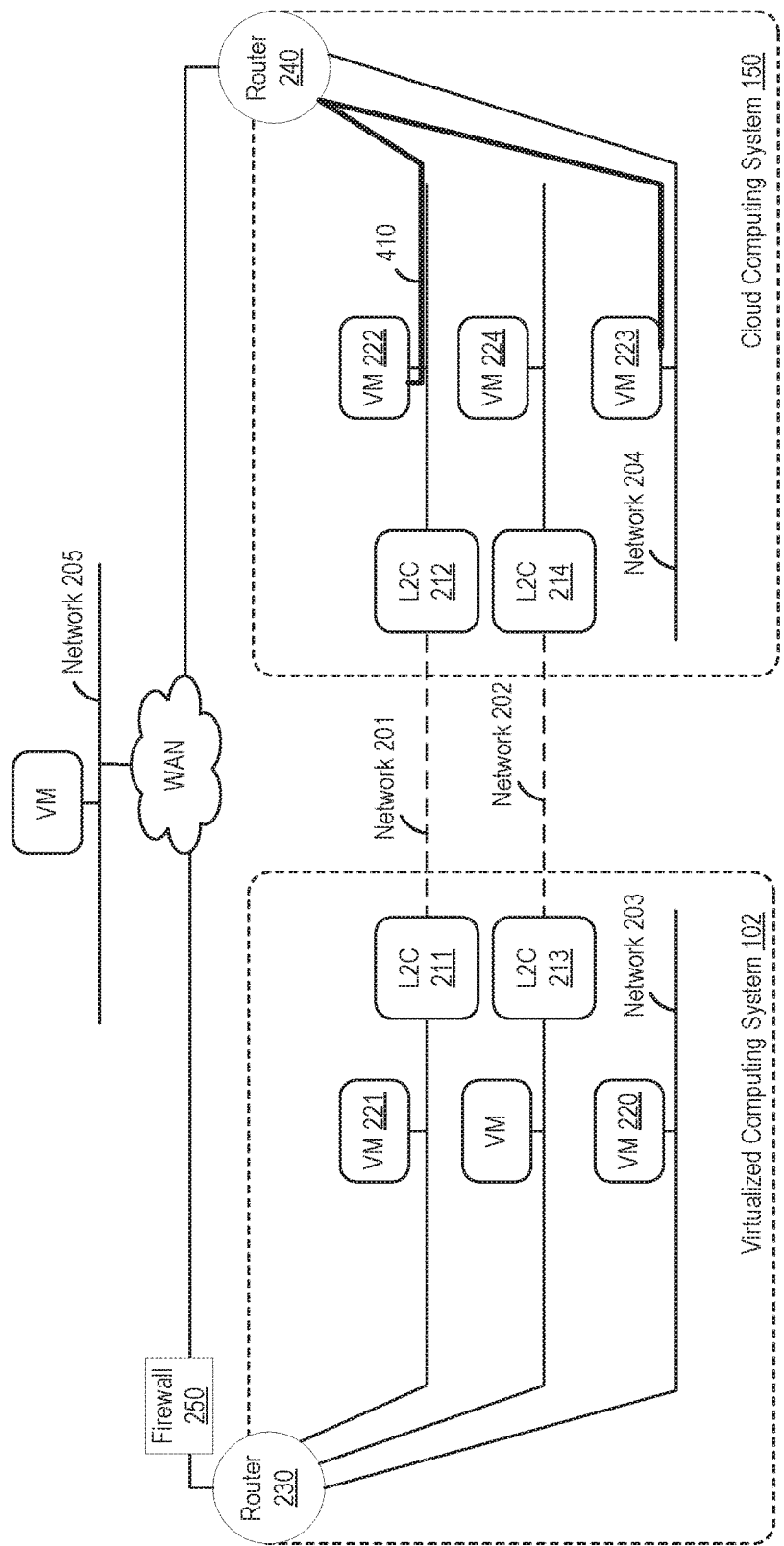
FIG. 5 illustrates an approach for routing optimization in a hybrid cloud computing system based on packet introspection, according to an embodiment.

FIG. 5 illustrates an approach for routing optimization in a hybrid cloud computing system based on packet introspection, according to an embodiment. As shown, packet introspection is used to determine whether traffic from VMs (e.g., VMs 222, 223, and 224) in cloud computing system 150 has a local destination that is also in cloud computing system 150 or a remote destination. To optimize traffic flows, hypervisor filtering modules are configured to modify the destination MAC addresses of packets having local destinations so as to divert such packets to a local router.

Figure 6:
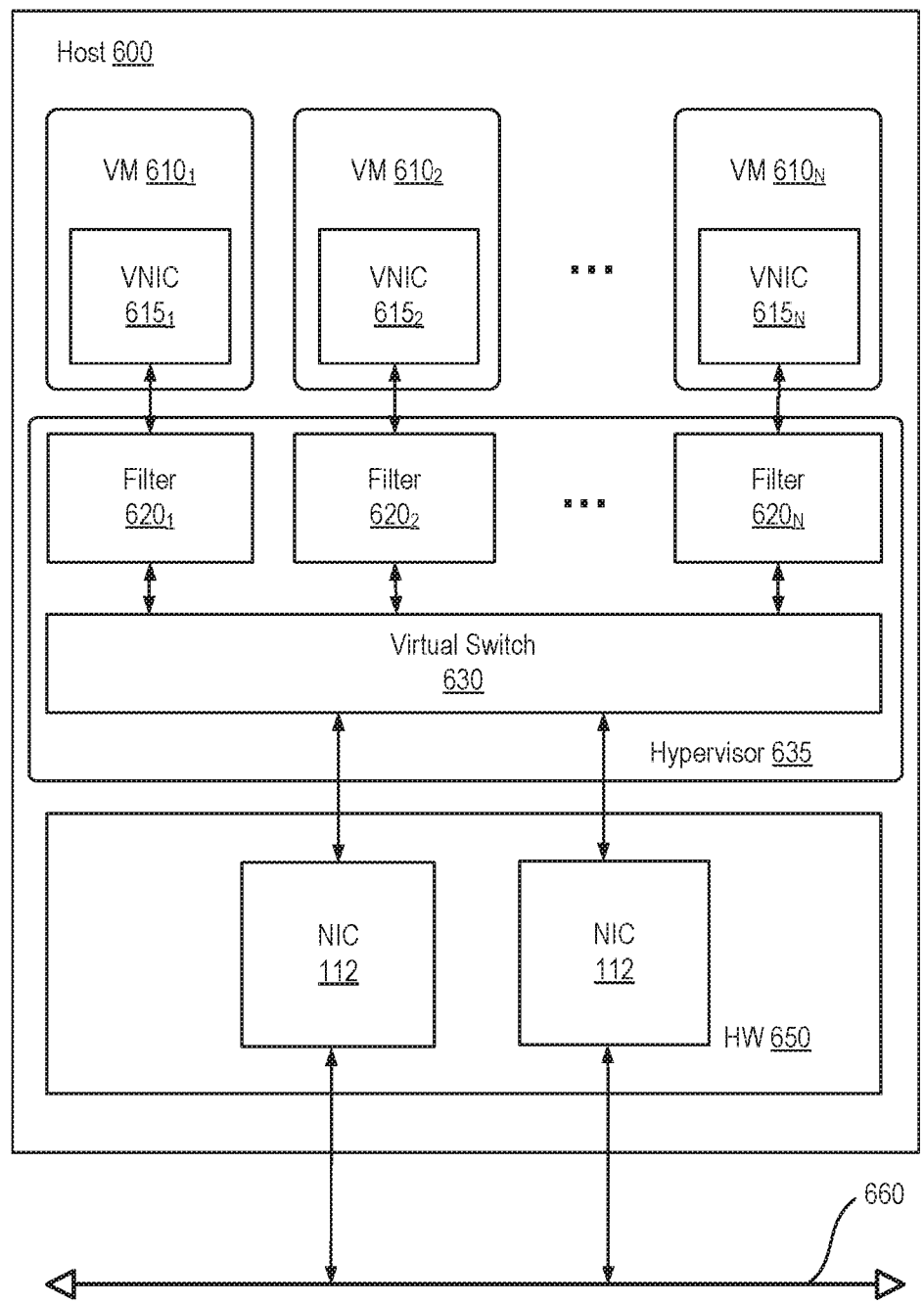
FIG. 6 illustrates a host system in which a hypervisor filter module may be implemented, according to an embodiment.

In one embodiment, the hypervisor filtering modules may be software components that interpose on input output (I/O) paths between virtual network interface controllers (VNICs) of VMs and ports of virtual switch(es). Commercially available products, such as NSX traffic filter or DVFilter from VMware, Inc. of Palo Alto, Calif., permit traffic filtering rules to be injected at the hypervisor level to modify packets. FIG. 6 illustrates an example of a host computer system 600 in which a hypervisor filtering module may be implemented, according to an embodiment. Host computer 600 may be, e.g., one of the virtual machine hosts in cloud computing system 150. As shown, host computer 600 includes a hypervisor 630 that serves as an interface between VMs $610_{1-3}$ and physical resources 650 available on host computer 600. Each virtual machine $610_{1-3}$ includes a respective VNIC $615_{1-3}$ which is responsible for exchanging packets between that virtual machine $610_{1-3}$ and hypervisor 630. VNICs $615_{1-3}$ may be software abstractions of physical network interface cards. Each of VM $610_{1-3}$ is connected through its VNIC $615_{1-3}$ to a respective virtual port provided by a virtual switch 630. As described, virtual switches are software-based switches acting as L2 forwarding engines and may be capable of performing VLAN tagging, stripping, filtering, L2 security, checksum, segmentation offload units, and other tasks typically performed by physical switches. In addition to being connected to VNICs $615_{1-3}$, virtual switch 630 is connected to physical network interface cards (PNICs) $640_{1-2}$ to allow network traffic to be exchanged between virtual machines 130 executing on host machine 100 and destinations on an external physical network 660. As shown, filter modules $620_{1-3}$ are associated with respective VNICs $615_{1-3}$, and may perform, e.g., filtering and encapsulation of packets originating in VNICs $615_{1-3}$, before the packets reach virtual switch 630. In one embodiment, filtering modules $620_{1-3}$ are specifically configured to introspect packets sent via VNICs $615_{1-3}$ and modify packets having local destinations to have the destination MAC address of a local router. In turn, virtual switch 630 may forward such modified packets to the local router rather than to a default gateway that is not local, as described in greater detail below. Although described herein primarily with respect to hypervisor filters such as filtering modules $620_{1-3}$ that are between VNICs and virtual switches, it should be understood that hypervisor filters may also be implemented as (or considered as) components of the virtual switches themselves within the hypervisors.

Returning to the FIG. 5, an unoptimized traffic flow from VM 222 to VM 223 in cloud computing system 150 may follow the tromboning path shown in FIG. 2A to a default gateway router 230 in virtualized computing system 102. To eliminate such tromboning, packet introspection may be employed to identify the local destinations of such packets and divert those packets along the path 410 shown in FIG. 5 to local router 240, as the network 204 to which the destination VM 223 is attached is entirely local to cloud computing system 150. In one embodiment, a virtual switch may be configured so that VM 222, 223, and 224 learn the MAC of R1 and already treat that as default router. Only when the virtual switch sees a packet which has to be redirected to R2, is the MAC changed on the fly in the filter.

In one embodiment, hybridity director 174 in cloud computing system 150 maintains an inventory of what sits in the cloud, such as extended networks (e.g., networks 201 and 202), local networks (e.g., network 204), and VMs (e.g., VMs 222, 223, 224) in the cloud. As described, hybridity director 174 may be responsible for migrating VMs from virtualized computing system 102 to cloud computing system 150, and hybridity director would then be aware that such migrated VMs are local to cloud computing system 150. Hybridity director 174 may obtain information on other VMs, networks, etc. that are in the cloud from elsewhere, such as from an inventory maintained by a virtualization management application which may be, e.g., a vCenter® Server available from VMware, Inc. To optimize traffic flows, hybridity director 174 configures hypervisor filtering modules in cloud computing system 150 with information specifying destinations that are local to cloud computing system. In addition, the hypervisor filtering modules are configured by hybridity director 174 with traffic filtering rules that divert traffic having local destinations to local router 240.

In one embodiment, hypervisor filtering modules in cloud computing system 150 may be configured with filtering rules to introspect IP packets leaving the VNICs of VMs 222, 223, and 224. Packets sent by VMs 222, 223, and 224 to destinations that are not on the local networks of may each have the destination MAC address(es) of the VMs' 222, 223, and 224 default gateway(s). The hypervisor filtering modules may, according to the configured filtering rules, rewrite the destination MAC addresses of packets destined to local destinations such as VMs on network 204 (e.g., VM 223), which is a local network wholly owned by router 240, to the MAC address of router 240. Doing so eliminates the tromboning of traffic from VM 222 to VM 223 discussed above with respect to FIG. 2A, as traffic having VM 223 as its destination will be diverted to router 240 and follow path 410 rather than tromboning to the default gateway router 230. In other cases when the destination of a packet is not local (e.g., the destination IP address is that of VM 220 on network 203 in virtualized computing system 102) or when the destination is on the same local subnet, the hypervisor filtering module that inspects the packet will not recognize the destination as a local address that needs to be diverted and will allow the packet to be routed according to its default path.

It should be understood that the packet introspection technique discussed with respect to FIG. 5 is purely delegated and may be offered as a service. In particular, the packet introspection technique does not require coordination between virtualized computing system 102 and cloud computing system 150 to work.

Figure 7:
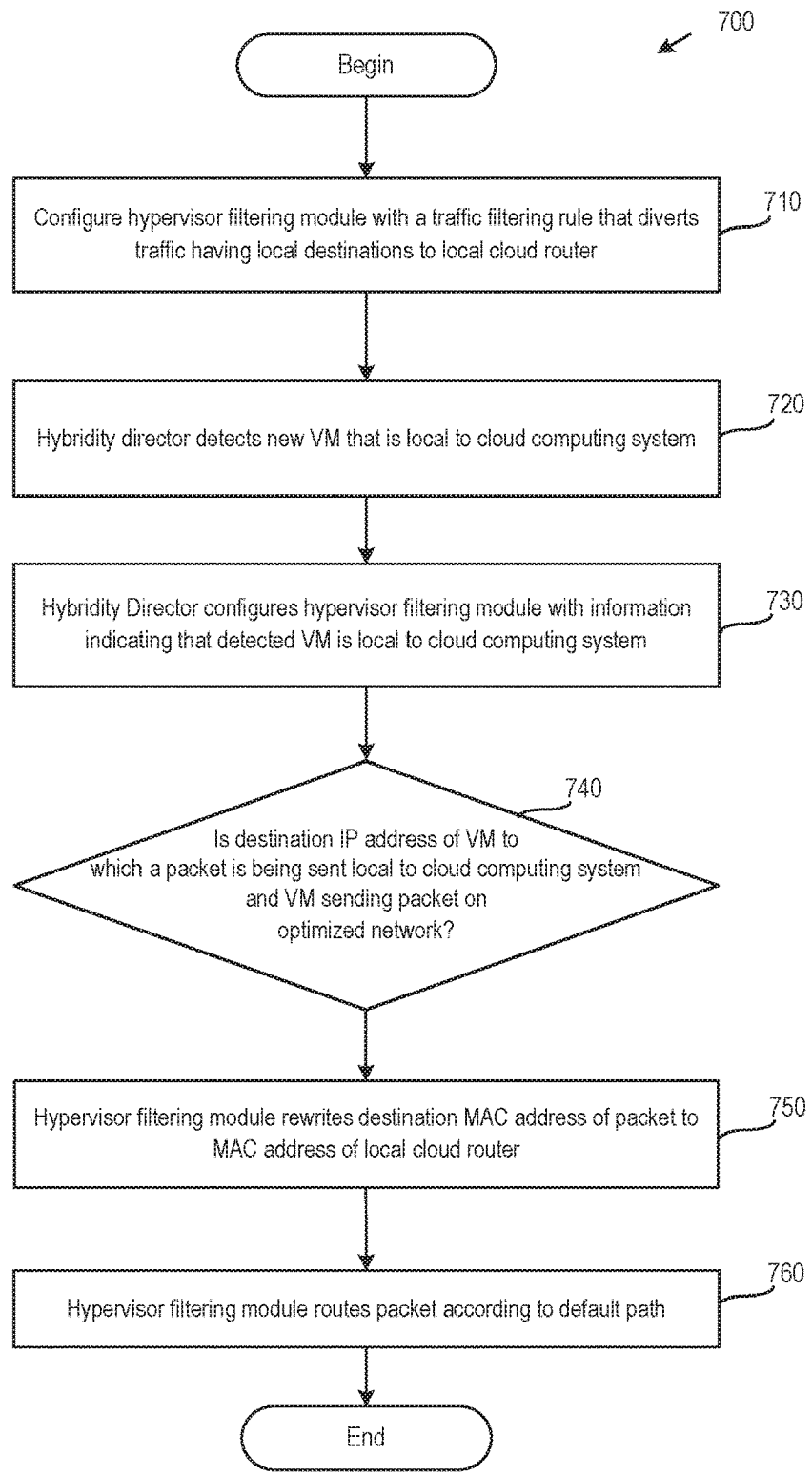
FIG. 7 illustrates a method of optimizing traffic flows in a hybrid cloud computing system using packet introspection, according to an embodiment.

FIG. 7 illustrates a method 700 of optimizing traffic flows in a hybrid cloud computing system using packet introspection, according to an embodiment. As shown, method 700 begins at step 710, where hybridity director 174 configures a hypervisor filtering module (e.g., one of filtering modules 620$_{1-3}$) with a traffic filtering rule that diverts traffic having local destinations to local cloud router 240. Although method 700 is described with respect to one hypervisor filtering module for simplicity, it should be understood that hybridity director 174 may generally configure multiple hypervisor filtering modules in cloud computing system 150. In one embodiment, the hypervisor filtering modules may be configured with filtering rules to introspect IP packets and to rewrite the destination MAC addresses of VMs on local networks to the MAC address of router 240. Doing so ensures that packets with local destinations are forwarded to the local router 240 in cloud computer system 150, rather than to, e.g., a default gateway router that located in virtualized computing system 102.

At step 720, hybridity manager 174 detects a new VM that is local to cloud computing system 150. As described, an inventory service in hybridity director 174 may be responsible for detecting new VMs being attached or existing VM being re-attached to networks in cloud computing system 150 through ports on virtual switch(es). Such VMs may be detected as new local VMs at step 720. As described, hybridity director 174 may also participate in migrating VMs to cloud computing system 150 and thus be aware that such migrated VMs are local to cloud computing system 150. In addition, information on other VMs, networks, etc. that are local to the cloud may be obtained from, e.g., an inventory maintained by a virtualization management application.

At step 730, hybridity director 174 configures the hypervisor filtering module with information indicating that the detected VM is local to cloud computing system 150. Then, at step 740, the hypervisor filtering module introspects a packet sent via an associated VNIC of a VM. The introspection of one packet at step 740 is described for simplicity, but it should be understood that the hypervisor filtering module may generally introspect all packets leaving the VNIC to which it is associated. In one embodiment, such introspection may include determining the destination IP addresses of packets leaving the associated VNIC.

At step 740, the hypervisor filtering module determines whether the destination MAC address of the packet should be rewritten because the destination IP address of the VM to which the packet is being sent is local to cloud computing system 150 and the VM sending the packet is on an optimized network. As described, the hypervisor filtering module is configured at step 710 with a traffic filtering rule that diverts packets having local destinations to local cloud router 240, by modifying the destination MAC addresses of those packets.

If the hypervisor filtering module determines that the destination MAC address should be rewritten at step 740, then at step 750, the hypervisor filtering module rewrites the destination MAC address of the packet to the MAC address of local cloud router 240. Such a modified packet may then be forwarded by a virtual switch to router 740 based on the re-written destination MAC address.

If, however, it is determined at step 740 that the destination MAC address should not be rewritten, then at step 760, the hypervisor filtering module allows the packet to be routed according to its default path.

In addition to the packet introspection approach discussed above, specific prefix routes, such as /32 routes, for VMs on route optimized networks in cloud computing system 150 may be injected into cloud router 240 and propagating to router 230 in the virtualized computing system. Doing so may eliminate inefficient routing of external traffic, as described above with respect to routing optimization using specific prefix routes.

Temporarily Tromboning Traffic of Live-Migrated Virtual Machines

Figure 8:
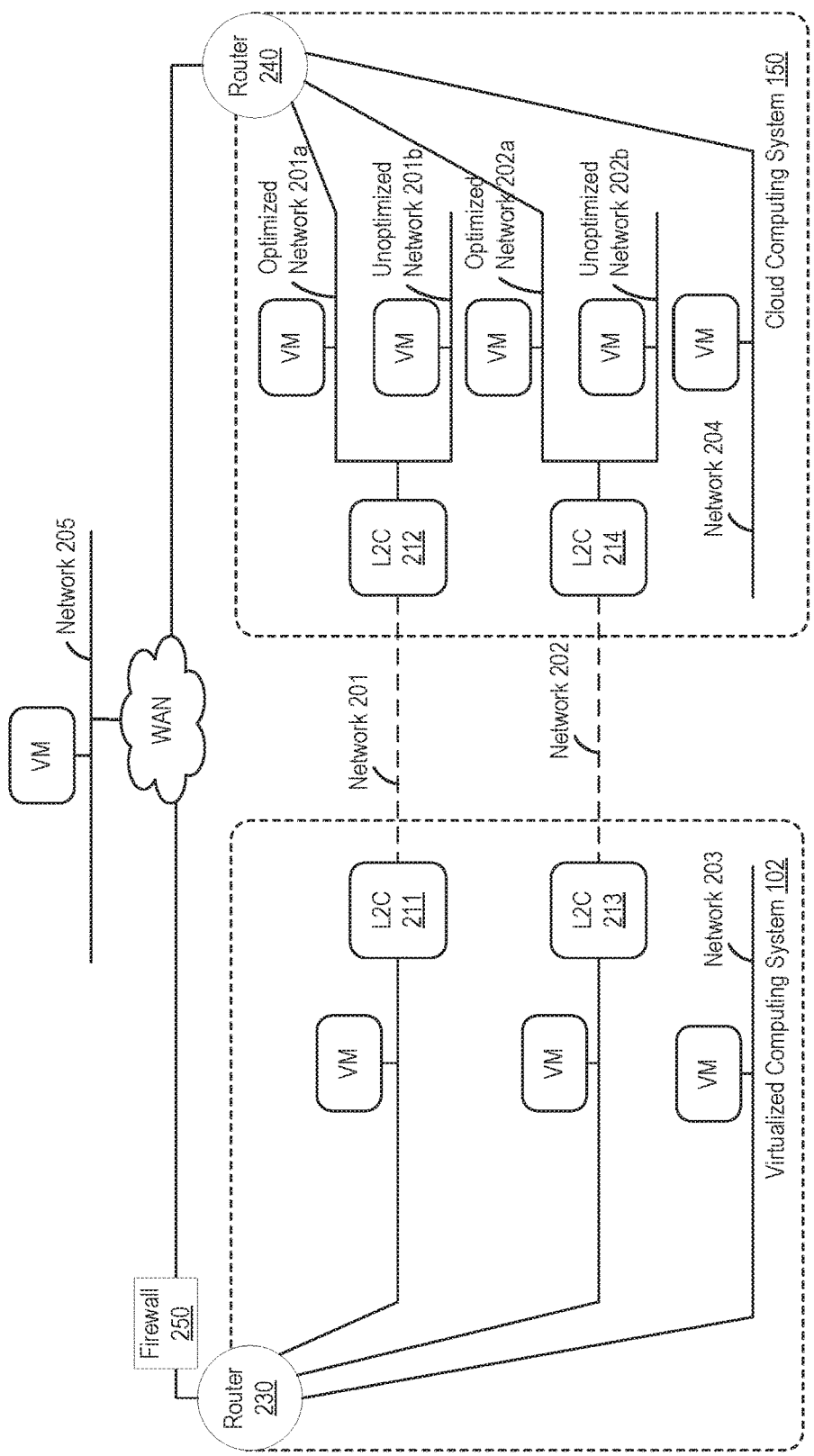
FIG. 8 illustrates an approach for tromboning traffic of live-migrated virtual machines to preserve active sessions, according to an embodiment.

FIG. 8 illustrates an approach for tromboning traffic of live-migrated virtual machines to preserve active sessions, according to an embodiment. Live migration of VMs from virtualized computing system 102 to cloud computing system 150 differs from disk-replication based VM migration in that the VM is powered off during DR-based migration and all connections (active sessions) are terminated, whereas active sessions are carried over to cloud computing system 150 when a VM is live migrated from virtualized computing system 102. It should be understood that, to keep the active sessions after a live VM migration, tromboning of traffic may be desirable. In particular, firewall 250 in virtualized computing system 102 may continue to tracking symmetric flows of the active sessions, so immediately optimizing routing as described above to divert traffic from the migrated VM to router 240 may break the symmetry expected by firewall 250.

As shown, to maintain the active sessions of a live-migrated VM (e.g., VM 222), the live-migrated VM is first attached to an unoptimized network with router 230 as the default gateway so that traffic tromboning occurs. In one embodiment, two stub networks, one of which is route optimized and another of which is not optimized, are created in cloud computing system 150 for each of extended networks 201 and 202. Illustratively, hybridity director 174 (or another cloud management application) creates an optimized network 201a and an unoptimized network 201b for extended network 201 and an optimized network 202a and an unoptimized network 202b for extended network 202. The routing of traffic on optimized networks 201a and 202a may be optimized according to the specific prefix technique discussed above with respect to FIG. 3-4 or the packet introspection techniques discussed above with respect to FIGS. 5-6, while VMs on unoptimized networks 201b and 202b continue using router 230 as their default gateway, which may result in tromboning traffic. Live migrated VMs are first attached to unoptimized network 201b or 202b to continue behaving as if they were in virtualized computing system 102, with some traffic tromboning back to virtualized computing system 102. By contrast, new VMs created in cloud computing system 102 and VMs migrated to cloud computing system 102 using DR-based migration may be directly attached to optimized networks 201a or 202a, as such VMs do not have active sessions that should be preserved.

The live-migrated VMs that are attached to unoptimized networks 201b or 202b may later be re-attached to optimized networks 201a or 202a at a suitable time. In one embodiment, such VMs may be reattached to optimized networks 201a or 202a when the VMs are powered off, in a maintenance mode, or in a quiet period. It should be understood that, when the VM is powered off or in the maintenance mode or quiet period, active sessions may be terminated. As a result, the VM may be shifted during those times from an unoptimized network to an optimized network, without downtime or affecting active session.

In one embodiment, to create an extended network such as network 201 or 202 with route optimized and unoptimized stub networks, hybridity director 174 first (1) creates a routed network in cloud computing system 150 with a router (e.g., router 240) having the same gateway IP address as that of a default gateway of an existing network in virtualized computing system 102 that is being stretched, (2) renumbers the router with a /32 gateway IP address, (3) filters the /32 gateway IP address from being announced to peer routers, and (4) creates a virtual extensible LAN (VXLAN) network for an isolated stretched network. It should be understood that, similar to the discussion above with respect to proximity routing using specific prefix routes, the routed network in this case will become a route optimized stub network. By contrast, the isolated VXLAN network will become an unoptimized stub network. Hybridity director 174 then connects the newly-created routed and VXLAN networks in cloud computing system 150 with the existing network in virtualized computing system 102, thereby creating the extended network, by (5) configuring an L2 concentrator (e.g., L2 concentrator 212 or 214) in cloud computing system 150 to drop packets having the source MAC address of router 240, (6) configuring the same L2 concentrator to drop ARP requests for the gateway IP address from/to the routed network, and (7) bridging the existing network in virtualized computing system 102, the routed network in cloud computing system 150, and the isolated VXLAN network in cloud computing system 150 via an L2 concentrator pair in the virtual 102 and cloud computing systems 150 (e.g., L2 concentrator pair 211 and 212, or 213 and 214). Thereafter, when a VM is migrated to cloud computing system 150 via DR-based migration, hybridity director 174 connects the migrated VM to the routed network, which is the route optimized stub of the extended network, and adds a /32 link route to the cloud router (e.g., router 240) for the IP address of the migrated VM that is also propagated back to a gateway router (e.g., router 230) in virtualized computing system 102, as described above. By contrast, when a VM is live-migrated to cloud computing system 150, hybridity director 174 connects such a migrated VM to the isolated VXLAN network, which is the unoptimized stub of the extended network, with VXLAN properties of the virtual switch port that the live-migrated VM is connected to being overridden with those of the isolated VXLAN network.

It should be understood that, rather than having to create both stub networks in cloud computing system 150 as new networks, one or more such networks may already exist in some cases. For example, a stub network may exist in cloud computing system 150 with VMs on it, and an extended network with the existing stub network as a route optimized network and another stub network as an unoptimized network may be created as follows: (1) renumber the existing stub network's router (e.g., router 240) with a /32 gateway IP address that is not announced to peer routers, (2) add /32 routes for VMs on the existing stub network, (3) create an isolated network to be the unoptimized stub network, and (4) bridge the two stub networks in cloud computing system 150 and a network in virtualized computing system 102 using an L2 concentrator pair. As another example, an extended network may already exist without routing optimization, and such an extended network may be transformed into an extended network with two stub networks, one of which is route optimized, as follows: (1) create an isolated stub network to be an unoptimized stub network and add it to the L2 concentrator bridge used by the existing extended network, (2) renumber the cloud computing system router (e.g., router 240) to have a /32 IP address while preventing the /32 IP address from being announced to peer routers, (3) add /32 routes for VMs on the network in cloud computing system 102 that is part of the existing extended network, (4) configure the cloud L2 concentrator used by the existing extended network to block packets with the cloud computing system router's (e.g., router 240) source MAC address, (5) configure the cloud L2 concentrator to block ARP requests for the gateway IP address from/to the cloud network that is part of the existing extended network, (6) connect cloud computing system router (e.g., router 240) to the network in the cloud that is part of the existing extended network.

Figure 9:
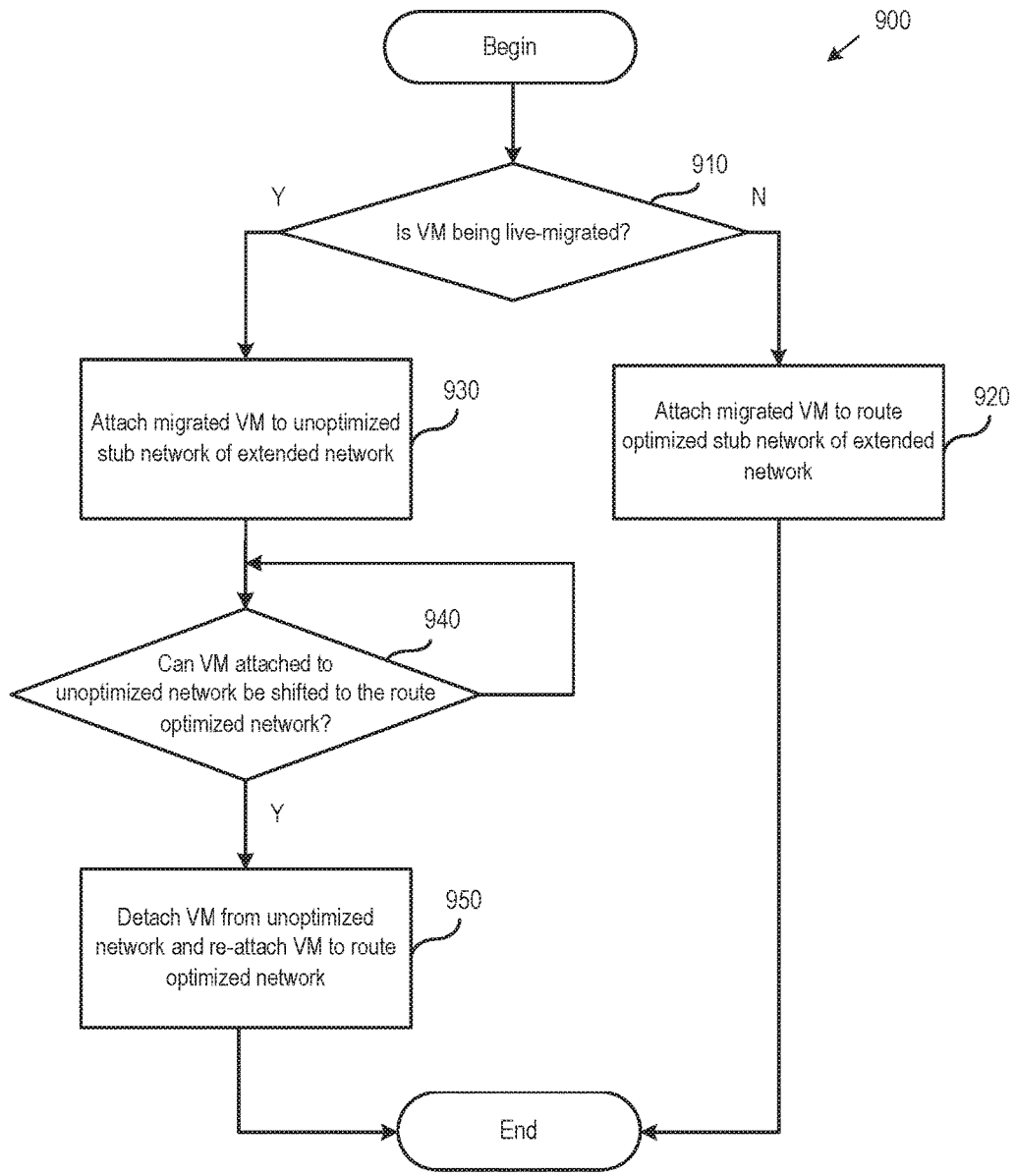
FIG. 9 illustrates a method of temporarily tromboning traffic of live-migrated virtual machines, according to an embodiment.

FIG. 9 illustrates a method 900 of temporarily tromboning traffic of live-migrated virtual machines, according to an embodiment. As shown, method 900 begins at step 910, where hybridity manager 174 determines whether a VM is being migrated from virtualized computing system 102 to cloud computing system 150 is live-migrated or not. As described, live migration is treated differently from DR-based migration, as a VM is powered off during DR-based migration, with all connections (active sessions) being terminated, whereas active sessions may be carried over to cloud computing system 150 when a VM is live migrated from virtualized computing system 102. In one embodiment, hybridity manager 174 may be responsible for migrating VMs, as noted above, and able to distinguish between live and DR-based migrations. However, it should be understood that hybridity manager 174 may also determine whether the VM is being live migrated or not in any other feasible manner.

If the VM is not being live migrated, then at step 920, hybridity manager 174 attaches the migrated VM directly to a route optimized stub network of the extended network, such as the optimized network 201*a* or 202*a* of extended network 201 or 202, respectively.

If on the other hand the VM is being live migrated, then at step 930 hybridity manager 174 attaches the live-migrated VM to an unoptimized stub network of the extended network. As described, doing so permits active sessions that are carried over to cloud computing system 150 during the live migration to be preserved, as traffic on the unoptimized network can trombone back to virtualized computing system 102.

At step 940, hybridity manager 174 determines whether the VM attached to the unoptimized stub network can be shifted to the route optimized stub network of the extended network. In one embodiment, hybridity manager 174 may monitor for the VM being powered off or rebooted, or placed in a maintenance mode or quiet period. As described, active sessions may be terminated when the VM is powered off or in the maintenance mode or quiet period, and the VM may then be shifted during those times to an optimized network without downtime or affecting active sessions.

If hybridity manager 174 determines that the VM attached to the unoptimized stub network can be shifted to the route optimized stub network, then method 900 returns to step 940, where hybridity manager 174 may, e.g., continue monitoring for the VM being powered off or rebooted, or placed in a maintenance mode or quiet period.

On the other hand, if hybridity manager 174 determines that the VM attached to the unoptimized stub network can be shifted to the route optimized stub network, then at step 950, hybridity manager detaches the VM from the unoptimized network and re-attaches the VM to the optimized network. In one embodiment, hybridity manager 174 may reconfigure properties of a virtual port on the unoptimized stub network (e.g., unoptimized network 201*b* or 202*b*) to which the VM is connected to instead point to a virtual port on the optimized stub network (e.g., network 201*a* or 202*a*). In a particular embodiment, hybridity manager 174 may disconnect the VNIC of the VM from the virtual port on the unoptimized stub network, modify the VXLAN ID and multicast IP address for of the virtual port through APIs provided by the a virtual switch, and reconnecting the VNIC to the virtual port. For example, suppose the optimized network has VXLAN ID 10000 and the unoptimized network has VXLAN ID 10001, then the port properties may be modified to change what the virtual switch encapsulates the VM's traffic to from VXLAN ID 10001 to VXLAN ID 10000. As a result, the VM will have a port on VXLAN with ID 10000, whose traffic is route optimized.

It should be understood that if, e.g., all VMs on extended networks 201 or 202 are moved to the cloud computing system 150 side and (either initially or eventually) transferred to optimized network 201a or 202a, then the L2 stretching and unoptimized networks 201b or 202b may be torn down and the L2 concentrator bridges removed so all that remains are optimized networks 201a or 202a within cloud computing system 150. Unoptimized networks 201b or 202b may also be removed or not used at all if, for example, there are no live VM migrations for which active sessions need to be preserved.

Although discussed herein primarily with respect to tromboning in which traffic with both source and destination within the cloud is routed from the cloud to the physically-separate data center and then back to the cloud, it should be understood that the opposite type of tromboning involving traffic with both source and destination within the data center being routed to the cloud may be remedied using techniques similar to those disclosed herein.

Advantageously, techniques disclosed herein provide stateful connection optimization in a hybrid cloud computing system. Such optimization may eliminate inefficient traffic patterns such as tromboning, while ensuring that traffic flows are symmetric. In addition, live-migrated VMs may be first attached to unoptimized networks in the cloud to force traffic tromboning and preserve active sessions, with such live-migrated VMs being later shifted to optimized networks when the VMs are powered off, or placed in a maintenance mode, or enter a quiet period, and the active sessions are terminated.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method of optimizing connections over an extended network created by bridging a first network in a first computing system, a second network in a second computing system, and a wide area network using a first bridging appliance in the first computing system and a second bridging appliance in the second computing system, comprising:
    configuring the first bridging appliance to:
        block packets with a source media access control (MAC) address belonging to a first router in the first computing system, and
        block address resolution protocol (ARP) requests for a gateway Internet Protocol (IP) address from and to the first network;
    configuring the first router in the first computing system to have a same gateway IP address as a second router in the second computing system that is a default gateway of the extended network;
    injecting, into the first router, one or more specific prefix routes for one or more respective virtual computing instances on the first network; and
    propagating the one or more specific prefix routes to the second router.

2. The method of claim 1, further comprising, propagating a route to a third network that is local to the first computing system to the second router.

3. The method of claim 1, wherein:
    the one or more specific prefix routes are /32 routes; and
    the first router is configured to have a /32 IP address which is not announced to peer routers.

4. The method of claim 1, further comprising, responsive to determining a first virtual computing instance has attached to the first network in the first computing system:
    injecting, into the first router, an additional specific prefix route for the first virtual computing instance; and
    propagating the additional specific prefix route to the second router.

5. The method of claim 4, wherein the first virtual computing instance has attached to the first network in the first computing system after migrating from the second computing system to the first computing system.

6. The method of claim 1, further comprising, responsive to determining a first virtual computing instance has detached from the first network in the first computing system:
    removing, from the first router, an injected specific prefix route associated with the first virtual computing instance.

7. The method of claim 1, wherein the first bridging appliance and the second bridging appliance are layer 2 (L2) concentrator appliances.

8. The method of claim 1, wherein the first computing system is a cloud computing system and the second computing system is an on-premise virtualized computing system.

9. The method of claim 1, wherein the virtual computing instances on the first network are virtual machines.

10. A non-transitory computer-readable storage medium containing a program which, when executed by one or more processors, performs operations for optimizing connections over an extended network created by bridging a first network in a first computing system, a second network in a second computing system, and a wide area network using a first bridging appliance in the first computing system and a second bridging appliance in the second computing system, the operations comprising:
    configuring the first bridging appliance to:
        block packets with a source media access control (MAC) address belonging to a first router in the first computing system, and
        block address resolution protocol (ARP) requests for a gateway Internet Protocol (IP) address from and to the first network;
    configuring the first router in the first computing system to have a same gateway IP address as a second router in the second computing system that is a default gateway of the extended network;
    injecting, into the first router, one or more specific prefix routes for one or more respective virtual computing instances on the first network; and
    propagating the one or more specific prefix routes to the second router.

11. The computer-readable storage medium of claim 10, the operations further comprising, propagating a route to a third network that is local to the first computing system to the second router.

12. The computer-readable storage medium of claim 10, wherein:
    the one or more specific prefix routes are /32 routes; and
    the first router is configured to have a /32 IP address which is not announced to peer routers.

13. The computer-readable storage medium of claim 10, the operations further comprising, responsive to determining a first virtual computing instance has attached to the first network in the first computing system:
    injecting, into the first router, an additional specific prefix route for the first virtual computing instance; and
    propagating the additional specific prefix route to the second router.

14. The computer-readable storage medium of claim 13, wherein the first virtual computing instance has attached to the first network in the first computing system after migrating from the second computing system to the first computing system.

15. The computer-readable storage medium of claim 10, the operations further comprising, responsive to determining a first virtual computing instance has detached from the first network in the first computing system:
removing, from the first router, an injected specific prefix route associated with the first virtual computing instance.

16. The computer-readable storage medium of claim 10, wherein the first bridging appliance and the second bridging appliance are layer 2 (L2) concentrator appliances.

17. The computer-readable storage medium of claim 10, wherein the first computing system is a cloud computing system and the second computing system is an on-premise virtualized computing system.

18. The computer-readable storage medium of claim 10, wherein the virtual computing instances on the first network are virtual machines.

19. A system, comprising:
a processor; and
a memory, wherein the memory includes a program executable in the processor to perform operations for optimizing connections over an extended network created by bridging a first network in a first computing system, a second network in a second computing system, and a wide area network using a first bridging appliance in the first computing system and a second bridging appliance in the second computing system, the operations comprising:
configuring the first bridging appliance to:
block packets with a source media access control (MAC) address belonging to a first router in the first computing system; and
block address resolution protocol (ARP) requests for a gateway Internet Protocol (IP) address from and to the first network,
configuring the first router in the first computing system to have a same gateway IP address as a second router in the second computing system that is a default gateway of the extended network,
injecting, into the first router, one or more specific prefix routes for one or more respective virtual computing instances on the first network, and
propagating the one or more specific prefix routes to the second router.

20. The system of claim 19, the operations further comprising, propagating a route to a third network that is local to the first computing system to the second router.

* * * * *